July 21, 1964 H. ENGELSTEIN 3,141,683

TAB CARD PROTECTIVE CARRIER

Filed Oct. 14, 1960

INVENTOR.
HAROLD ENGELSTEIN
BY Kenyon & Kenyon
ATTORNEYS

United States Patent Office 3,141,683
Patented July 21, 1964

3,141,683

TAB CARD PROTECTIVE CARRIER

Harold Engelstein, 733 Caffrey Ave., Far Rockaway 91, N.Y.

Filed Oct. 14, 1960, Ser. No. 62,568
2 Claims. (Cl. 281—44)

The present invention relates to protective plastic carriers for tabulator cards.

In modern quality and process control operations, use is made of tabulator cards on which information to be stored, analyzed or otherwise processed is entered in the form of pencil markings which may be read off and tabulated in electronic computers or data control devices. Such cards are generally provided with vertical columns having a row of data entry positions, the cards being divided into zones and fields. Cards of this type are commonly known as I.B.M. or Remington cards and have been standardized in size (3.52" x 7.375"—thickness 0.0067"). Usually one corner of the card is cut to facilitate handling, matching and filing.

In certain factory operations, tabulator, or tab cards as they are commonly known, travel with the material being worked on through various stages of production. Such cards may be used, for example, in connection with production material requisitions. It is the usual practice to have the factory operators make entries on the cards at each stage in the production line, the completed card at the end of a line being fed into an automatic computer which determines warehouse, production or stock requirements.

Since each card is handled by many factory operators who make entries at the respective machine stations, the cards often become damaged or mutilated at the edges. Because of fraying, tearing and curling, the cards may not at the end of the production run be in a suitable condition for processing through automatic equipment.

Accordingly, it is the primary purpose of this invention to provide a protective carrier for a tab card which obviates the drawbacks mentioned above and which preserves the card through its various stages of handling to maintain the card in proper condition for data processing.

More particularly, it is an object of the invention to provide a protective carrier formed of plastic material, the carrier exposing only those areas of the card in which entries are to be made and at the same time supplying a relatively rigid backing for the card which facilitates writing thereon. A significant feature of the carrier is that it maintains the edges of the card therein under constant spring tension, thereby holding the card perfectly flat while fully protecting the edges thereof.

Yet another object of the invention is to provide a protective carrier which is formed of transparent thermoplastic material and which may be manufactured and sold at relatively low cost.

Briefly stated, a carrier in accordance with the invention is constituted by a rectangular base plate having flaps attached to the opposing edges thereof, the flaps being adapted to engage the edges of a tab card insert and to hold said edges under tension. Secured to the base plate, in the rectangular area defined between the flaps, is a rectangular sheet providing in combination with the base plate, a writing platform. The platform sheet is attached to the base plate by means of longitudinally extending ribs which serve also to rigidify the carrier structure and to prevent curling of the card insert therein.

For a better understanding of the invention as well as other objects and further features thereof, reference is made to the following detailed description to be read in conjunction with the accompanying drawing showing several views of a preferred embodiment of a tab carrier in accordance with the invention, like components in the several views being identified by like reference numerals.

Figures 1, 2, 3, 4:
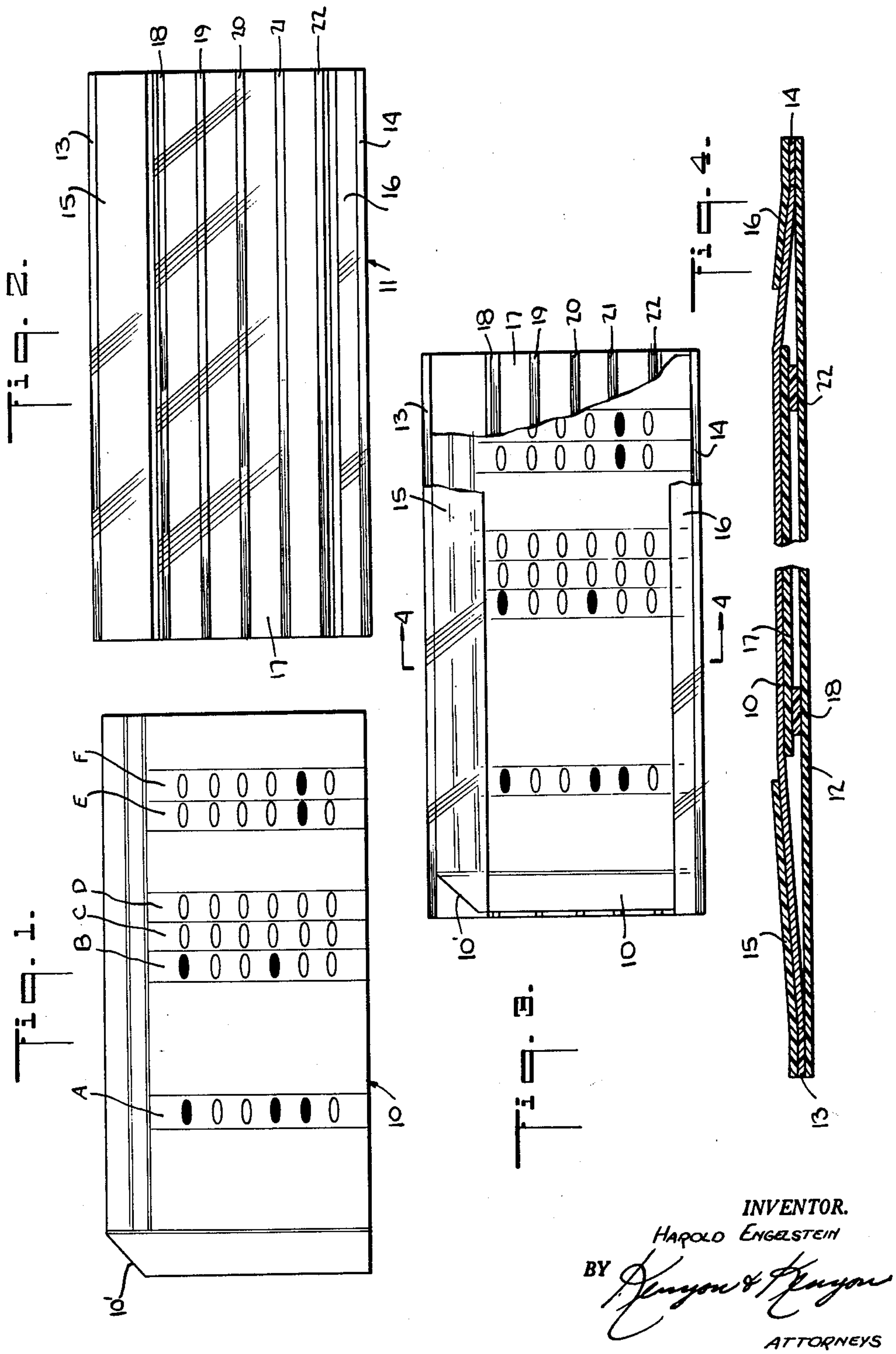
FIG. 1 illustrates one typical form of tab card.
FIG. 2 shows, in plan view, a protective carrier in accordance with the invention.
FIG. 3 shows the carrier with the tab card inserted therein.
FIG. 4 is a transverse section taken along the lines 4—4 in FIG. 3.

Referring now to the drawings and more particularly to FIG. 1, a typical tab card is shown, the card 10 being rectangular in shape and being cut out of paper sheet stock. One corner 11 is notched to facilitate handling. The card is ruled into columns, and some of the columns, such as columns A to F, are divided into rows having elliptical entry areas printed therein. These areas are initially blank and entries are made by filling in appropriate areas in pencil, in ink or by the use of magnetic fluid.

The entries on the card may be sensed, read off and processed in electronic computer systems by means well known in the art. Since the card is of relatively fragile paper stock, it has a tendency to curl and it may also be easily mutilated particularly if the card is subject to repeated handling. It is also quite difficult to write on the card without a supporting desk surface. The purpose of the carrier protector, generally designated by numeral 11 in FIGS. 2 to 4, is not only to provide a rigid backing for the card serving, in effect, as a portable desk therefor but also to protect the card to handling. The carrier is designed to make it easy both to insert and withdraw the card therefrom.

The tab carrier is constituted by a rectangular base plate 12 formed of a transparent flexible plastic material, such as cellulose acetate, Mylar or any of the known materials commonly used in the manufacture of transparent protective jackets and covers for papers, cards and the like. Secured marginally to the longitudinal edges of base plate 12, by means of flat ribs 13 and 14, are flaps 15 and 16, respectively, the flap 15 being relatively broad.

Flaps 15 and 16 are made of the same flexible material as the base plate and since they are marginally secured to the base plate by ribs, they act as resilient hinges. Thus to insert the card 10, one has merely to place the edges of the card under the upper and lower flaps of the carrier, thereby resiliently locking the card in place.

A rectangular platform strip 17 is secured to the base plate 12 in the rectangular area defined between the upper and lower flaps 15 and 16, the platform being attached by means of a series of longitudinally extending parallel ribs 18, 19, 20, 21 and 22. Ribs 18 to 22 slightly elevate platform 17 and at the same time serve to rigidify the carrier structure to prevent curling thereof. The platform surface affords a desk-like writing surface for the card behind the area thereon in which entries are to be made. At the same time, the elevation of the central area of the tab card relative to the edges thereof underlying flaps 15 and 16, as best seen in FIG. 4, causes the flaps 15 and 16 to impose a downward tension on the edges. In this way the position of the card within the carrier is held. To remove the card from the carrier, one has merely to raise the resilient flaps. The carrier may be used repeatedly.

The several ribs are preferably made of a translucent pigmented plastic material. In manufacturing the carrier, the base plate may be made from a relatively broad web of plastic which is fed into a combining machine jointly with three top webs for the two flaps and the platform, the ribs which are taken from continuous narrow ribbons being interposed in the combiner between the base web and the three top webs. The rib ribbons are first conducted through adhesive baths to coat both sides thereof so that when they are conveyed through the combining machine, the various elements are bonded together to form a continuous band which may then be sectioned to the desired carrier size.

While there have been shown what are considered to be preferred embodiments of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A protective carrier for rectangular tabulator cards to prevent mutilation thereof in the course of repeated handling, comprising a rectangular base plate formed of transparent flexible plastic material and having all dimensions slightly larger than said card, first and second flaps, ribs marginally connecting said first and second flaps to opposing longitudinal edges of said base plate, said ribs being interposed between said flaps and said plate and having adhesive layers thereon to effect said connection therebetween, a rectangular deck at least equal in length and width and in a position to underlie the record area of the card, and a plurality of parallel ribs extending longitudinally along said base plate to connect said deck to said plate in the central area defined by said flaps, said parallel ribs being interposed between said plate and said deck and having adhesive layers thereon to effect said connection therebetween, said parallel ribs elevating said deck and thereby raising the central area of a card insert relative to the edges thereof under said flaps whereby said card edges are tensioned by said flaps.

2. A carrier as set forth in claim 1, wherein said plate, said flaps and said deck are all made of cellulose acetate.

References Cited in the file of this patent

UNITED STATES PATENTS 2,843,955 Engelstein ............ July 22, 1958